Aug. 9, 1932.  W. C. PITTER  1,870,644

CLUTCH MECHANISM

Filed Nov. 26, 1930

Inventor
Walter Charles Pitter
By Luther Johns
Atty.

Patented Aug. 9, 1932

1,870,644

UNITED STATES PATENT OFFICE

WALTER CHARLES PITTER, OF EPPING, ESSEX, ENGLAND, ASSIGNOR TO THE PITTER TRUST, OF CHICAGO, ILLINOIS, A COMMON LAW TRUST

CLUTCH MECHANISM

Application filed November 26, 1930. Serial No. 498,209.

The present invention relates to a clutch or gripping device of the kind in which a driving member and a driven member are arranged whereby the driving member will be clutched with the driven member in one direction of rotation and be released when turned in the other direction.

The clutch of this application is similar in various respects to that shown in my copending application Serial No. 293,593, filed July 18, 1928. The present application shows a simplification of the device and a reduction in the number of its parts, with a corresponding reduction in cost. Other objects and advantages will appear hereinafter.

In the drawing Figure 1 is a medial vertical longitudinal section of a device embodying my present invention;

Figure 1:
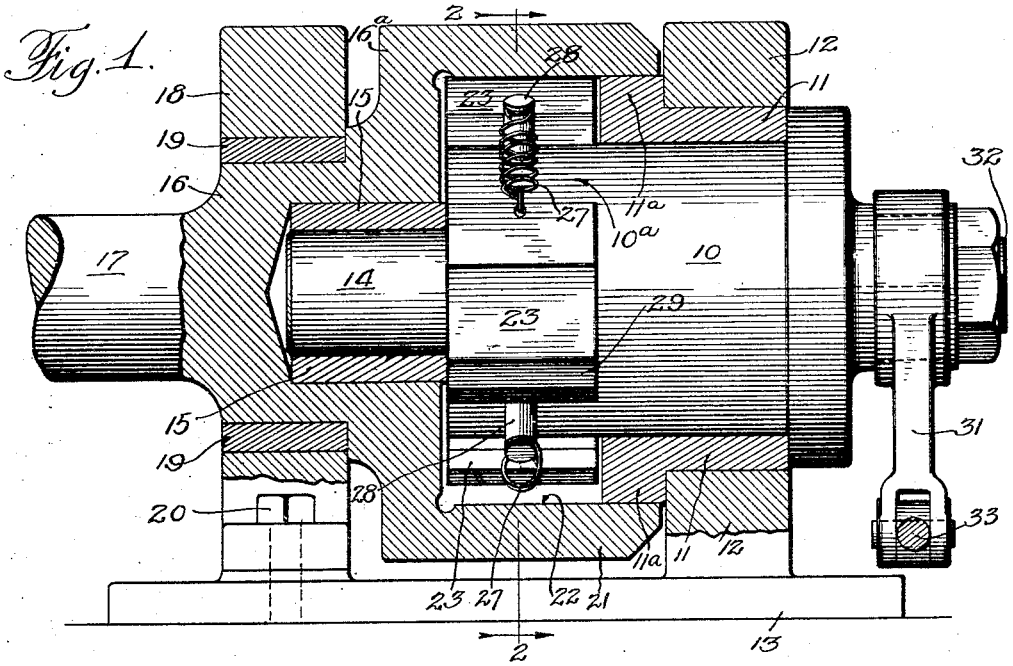

The cylindrical driving member 10 is mounted for rotation in the bushing 11 fixed in the support 12 which is shown integral with the base 13. The reduced end 14 of the driving member 10 is journaled in a bearing 15 which is centrally located in the output member 16 having an output shaft 17 which may be in driving relation to any suitable device. A support 18 having a bearing 19 for the driven member 16 is held on base 13 for ready removability by bolts 20.

The enlarged portion 16a of the driven member 16 is a cup-shaped part having an annular wall 21 provided with an interior cylindrical surface 22 the front end portion of which fits as bearing upon the annular flange 11a of bearing member 11.

The input or driving member 10 and the output or driven member 16 are thus held in aligned relation. The wall 21 is spaced from and surrounds the inner end of driving member 10 to form an annular space occupied by a plurality of elongated gripper elements 23 arranged circumferentially. Each gripper 23 has a power-applying link or strut element 24 pivotally mounted in an arcuate recess 25 milled in the under side of the gripper, with the inner end of the link pivoted in a corresponding arcuate recess 26 milled longitudinally in the inner end of driving member 10. These links 24 are directed somewhat tangentially with respect to the driving member.

A separate tension spring 27 is attached at one end to each gripper element 23, the other end of the spring being secured to a fixed pin 28 in the member 10. The spring 27 maintains a constant tension on the associated gripper and maintains a tight relation between the gripper and the link and between the link and its seat in the driving member.

Each gripper 23 has an arcuate face 29 near one end corresponding to the inner periphery 22 of cylindrical wall 21. A radial line A passes through this surface 29. The inner side of the gripper 23 has an inclined surface 30 shown as extending to the free end of the gripper. This surface 30 contacts the cylindrical surface 10a of the driving member 10. A radial line B passes through this contact area, which is really only a line in width.

The tension of spring 27 maintains the inclined surface 30 in contact with the face 10a of driving member 10, and the arcuate surface 29 is maintained lightly in contact with the inner periphery 22 of the shell or wall 21. When the driving member 10 is turned in a clockwise direction, as viewed in Fig. 2, the struts 24 are forced outward, carrying outward the rear end portions of the elongated grippers, which are levers, and, owing to the displacement of the gripping surfaces 29 and 30, as indicated by the lines A and B, the grippers become bound tightly between the surfaces 22 and 10a. The springs 27 cooperate in this binding action by maintaining the grippers in position for immediate action on the slightest relative movement of the driving member in the driving direction.

Figure 2:
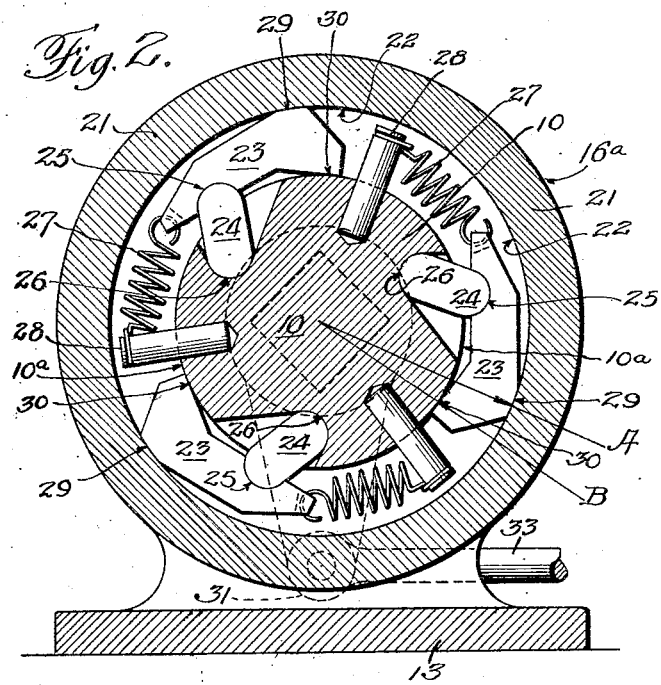
Fig. 2 is a cross section on the line 2—2 of Fig. 1.
Figure 3:
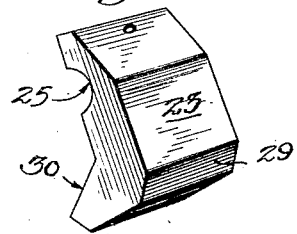
Fig. 3 is a detail perspective of one of the gripping element.
Figure 4:
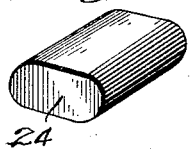
Fig. 4 is a detail perspective of one of the struts which support and operate one end of the gripping elements respectively.

When the driving member 10 is turned in a counter-clockwise direction, as viewed in Fig. 2, the effect is to draw the inner end of the gripper lever inward slightly, releasing the gripping surfaces 29 and 30 and permitting the driving member to reverse freely.

For operating the driving member I have shown an arm 31 mounted on a reduced portion 32 of the driving member 10 with a rod 33 connected to arm 31. This provides for a back and forth rocking movement of the driving member with a consequent step-by-step forward movement of the driven member. The driving member may be rotated, of course, with a continuous motion, and such various applications of the device may be made as occasion may suggest.

A feature of prime importance is in the fact that the driving and driven members are locked together positively and directly through strong and rigid elements, namely the grippers, without the intervention of any joints or connections. That is to say, while joints occur at 25 and 26, the driving power is not transmitted through these joints or through the struts 24. Those joints and the struts operate to hold the grippers in their gripping position, but when the gripping action takes place the power is transmitted directly through the front ends of the grippers respectively from the driving member to the driven member. In the clutch of said copending application the gripper is locked in an annular recess carried by the driven member and the power is transmitted from the driver through the link-and-lever mechanism to the driven member. According to the present device the inner and outer members are locked more directly together, and the device may be unusually strong and powerful. For example the part 23 may be as wide as desirable and provide gripping surfaces of relatively great extent, and the surfaces as 22 and 10a may be correspondingly wide and free from areas lost to gripping action. The notable width of the strut member maintains the gripper in its desired position free of all tendency to cant relative to the surfaces 22 and 10a, insuring perfect coaction at the instant of gripping action.

I contemplate as being included in these improvements all such changes, variations and departures from what is thus specifically illustrated and described as fall within the scope of the appended claims.

I claim:

1. A clutch mechanism having coaxial rotary driving and driven members arranged to leave an annular interspace of uniform axial and radial dimensions over the entire circumferential length, including tiltable gripping members located in the interspace, and pinless struts each seated in an arcuate recess of a gripping member at one end and in an arcuate outwardly diverging recess of the driving member at the other end.

2. A clutch mechanism having coaxial rotary driving and driven members arranged to leave an annular interspace of uniform axial and radial dimensions over the entire circumferential length, including tiltable gripping members in the interspace, said gripping members having uniform width corresponding to the axial length of the interspace over their entire length, and pinless struts each seated in an arcuate recess of a gripping member at one end and in an arcuate outwardly diverging recess of the driving member at the other end.

3. A clutch mechanism having coaxial rotary driving and driven members arranged to leave an annular interspace of uniform axial and radial dimensions over the entire circumferential length, including tiltable gripping members arranged in said interspace, and pinless struts each seated in an arcuate recess of a gripping member at one end and in an arcuate outwardly diverging recess of the driving member at the other end, said struts having a width corresponding over their entire length to the axial length of the annular interspace between the driving and driven members.

4. A clutch mechanism, comprising a pair of bearing standards, bearing bushings in said standards, a driving member and a driven member rotatably supported in said bushings respectively, the driven member being provided with an axial cavity, a bearing bushing located within said cavity, the driving member being provided with a journal extension rotatably supported in said bearing bushing, the driving member and the driven member confining between them an annular channel of rectangular cross-section, tiltable gripping members within said channel and having uniform width over their entire length, the width of the tiltable gripping members corresponding to the axial length of the channel, pinless struts each seated in an arcuate recess of a gripping member at one end and in an arcuate outwardly diverging recess of the driving member at the other end, and springs connecting said tiltable members to the driving member.

WALTER CHARLES PITTER.